May 26, 1959 D. C. O'BRIEN 2,888,086
CARRIAGE OSCILLATING DEVICE
Filed Sept. 6, 1957 2 Sheets-Sheet 1
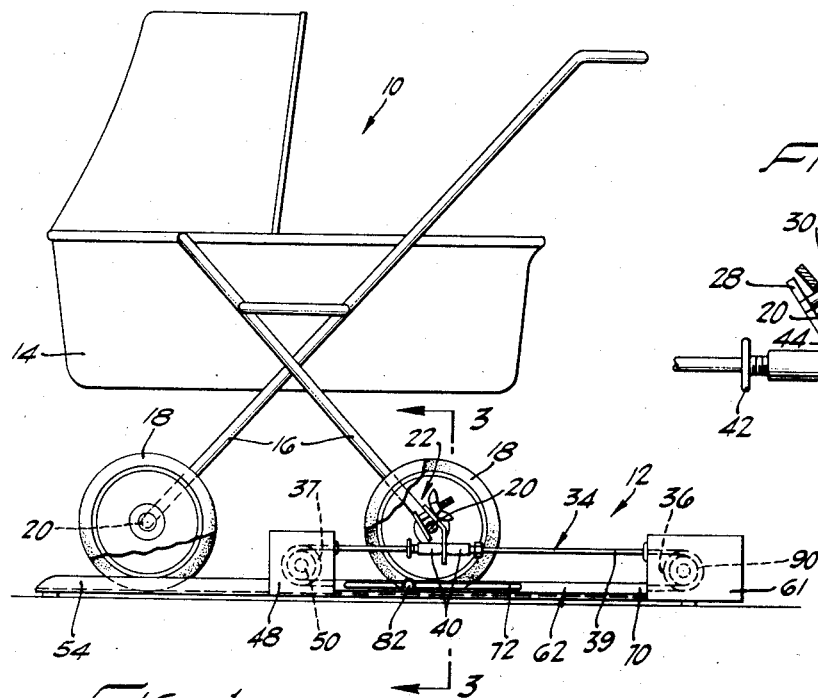
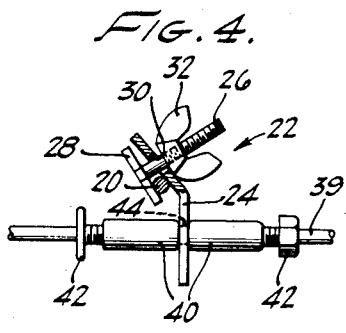
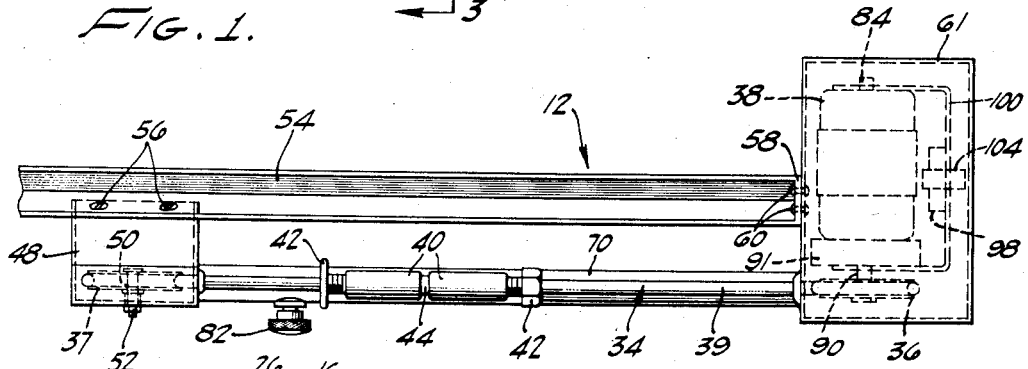
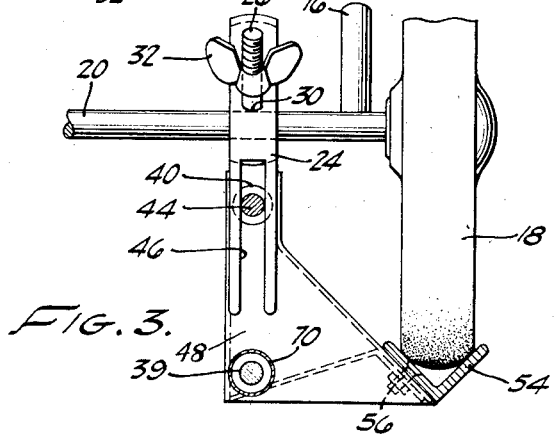
INVENTOR.
DANIEL C. O'BRIEN
BY Lyon & Lyon
ATTORNEYS May 26, 1959  D. C. O'BRIEN  2,888,086
CARRIAGE OSCILLATING DEVICE
Filed Sept. 6, 1957  2 Sheets-Sheet 2

INVENTOR
DANIEL C. O'BRIEN
BY Lyon & Lyon
ATTORNEYS

United States Patent Office 2,888,086
Patented May 26, 1959

2,888,086

CARRIAGE OSCILLATING DEVICE

Daniel C. O'Brien, Glendale, Calif.

Application September 6, 1957, Serial No. 682,455

3 Claims. (Cl. 180—1)

This invention relates to a device for causing and controlling sequential oscillations and particularly to such a device for controllably oscillating a baby carriage.

Systems whereby a controlled oscillating motion may be imparted to a body are well known and such devices could be applied to baby carriages whereby the carriage is rocked or moved generally back and forth. Such conventional devices have disadvantages. For example, the oscillating mechanism conventionally employed had a definite stroke length. In the event some obstacle as, for example, a child's hand were placed in the oscillating or reciprocating system, such obstacle would not shorten the stroke length. In cases where a safety device were employed, the obstruction would stop the motor system requiring a reestablishing of the reciprocating or oscillating action. In addition, conventionally the carriage is merely attached to the reciprocating system and a straight line force applied. In such cases the carriage may start to deviate from a straight line path at an angle to the direction of the applied force, requiring a realignment of the carriage. The carriage could, therefore, not be left unattended for an extended period of time, partially defeating the purposes of the device.

It is an object of the present invention to provide a device for imparting reciprocating motion to a carriage which overcomes the above disadvantages.

Another object of the present invention is to provide an oscillating or reciprocating system which automatically and controllably reverses itself in the event an obstruction is placed in the system.

A further object of this invention is to provide a device which will force the carriage to oscillate in a predetermined path.

A more particular object of this invention is to provide an oscillating system for a baby carriage which is safe, uncomplicated and may be readily attached.

Other objects and advantages, it is believed, will be apparent from the following detailed description of a preferred embodiment thereof when taken in connection with the accompanying drawings in which:

Figure 1 is a side elevation of the device as applied to a baby carriage.

Figure 2 is an enlarged fragmentary plan view of the device partially sectionalized.

Figure 3 is a vertical sectional view taken substantially along the line 3—3 of Figure 1.

Figure 4 is an enlarged detail of the clamp which couples the carriage to the oscillating device.

Figure 5:
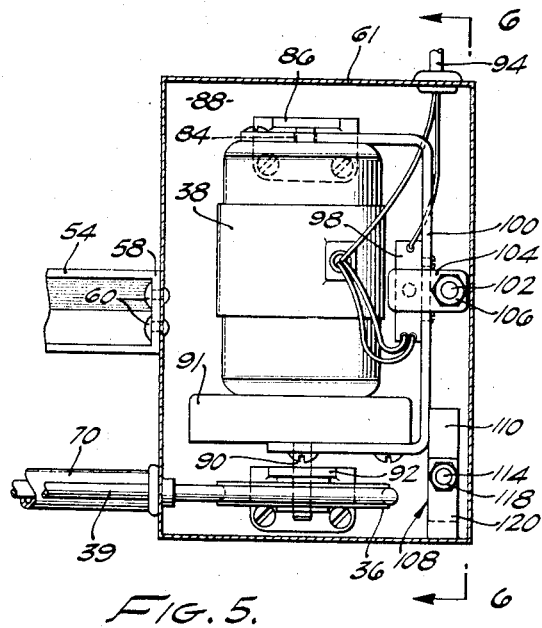
Figure 5 is a plan view of the motor system of the oscillating device.
Figure 7:
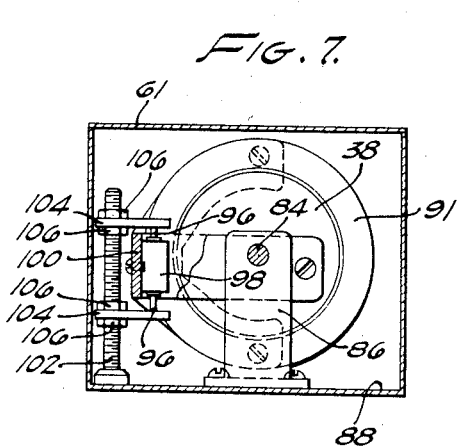
Figure 7 is an end section taken substantially along the line 7—7 of Figure 6.
Figure 6:
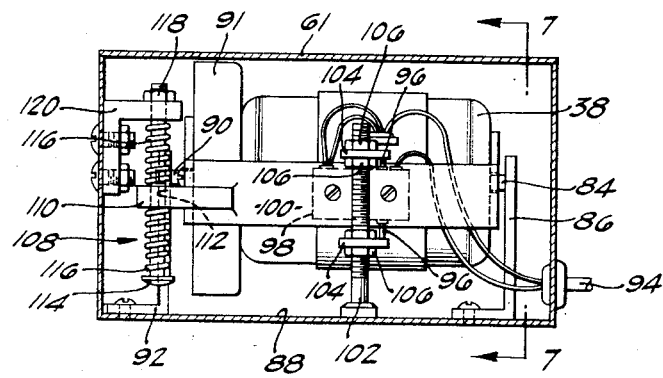
Figure 6 is a vertical section taken substantially along the line 6—6 of Figure 5.
Figure 8:
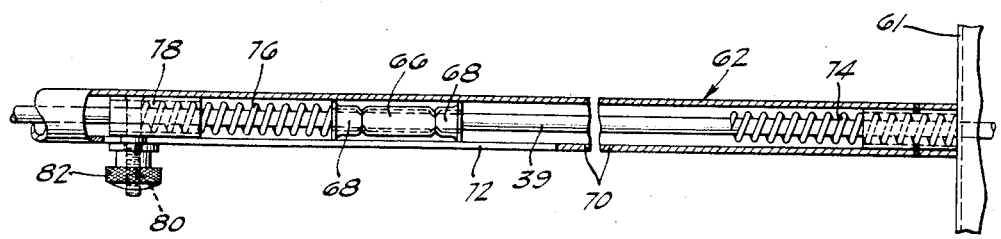
Figure 8 is a plan sectional view of the stroke control mechanism.

Referring now to the drawings, a conventional baby carriage 10 is mounted on and secured to an oscillating device indicated generally at 12. The carriage includes a bed portion 14 and the supporting elements 16. The carriage 10 is equipped with two pairs of wheels 18 secured to suitable axles 20. The carriage is secured to the oscillating device by means of a clamp 22. The clamp includes an angle arm 24 and a threaded bolt 26 to which is welded a holding plate 28. The arm 24 is provided with an opening 30 through which the bolt 26 passes. One axle 20 of the carriage 10 is positioned between the plate 28 and the arm 24 and a butterfly nut 32 engaging the bolt 26 is used to clamp the axle between these elements.

The oscillating device includes a continuous cable system 34 carried by a pulley system, having a driving pulley 36, and a driven pulley 37, and a reversible motor 38. The cable system 34 includes a strand 39 which is provided with a pair of threaded sleeves 40 and a pair of cable bolts 42. The ends of the strand 39 are secured to and held by the bolts 42 which are threaded into the ends of the sleeves 40. The sleeves are joined together to form the continuous cable system by a rod 44 threaded at either end. The arm 24 is secured to the cable system 34 by passing the rod 44 through an opening 46 in the leg of the arm 24 and securing the sleeves 40 to either side of the rod 44 so that the sleeves butt against the sides of the arm. The tension in the cable system may be adjusted by the suitable positioning of the bolts 42.

The driven pulley 37 is housed within a casing 48 which is provided with suitable openings through which the strand 39 may pass. The pulley 37 is secured to the side of the casing 48 by a pulley shaft 50 and a nut 52 and positioned vertically so as to lie in a plane parallel to an offset from the plane of the wheels 18.

To one side of the casing 48 is secured a V-shaped track 54 which is fastened to the casing by suitable bolts 56. The end 58 of the track 54 is secured as by rivets 60 to a motor housing 61 and the track positioned so as to have a major axis parallel to the strand 39. The wheels 18 on one side of the carriage are positioned within the upturned V of the track 54 and are allowed to roll thereon. The direction of motion of the carriage is, therefore, accurately controlled by the combination of the clamp 22 and the track 54.

The length of stroke, i.e., the distance of travel of the carriage is controlled by a spring system indicated generally at 62 on the lower portion of the strand 39. This portion of the strand is provided with a sleeve 66 having a pair of cups 68 at the ends thereof. The sleeve is secured firmly to the strand 39 thereby preventing lateral motion of the sleeve along the strand. The strand is housed within a tubular member 70 which joins the casing 48 to the housing 61. One side of the tubular member is provided with a slot 72. Within the member and encircling the strand 39 is a spring 74 which abuts against the side of the motor housing 61. On the opposite side of the sleeve 66 is a second spring 76 which is seated within a movable tube 78 encircling the strand 39. A threaded pin 80 passes through the tube 78 and projects outwardly through the slot 72. A lock nut 82 threadedly engages the projecting end of the pin 80 and upon tightening, butts against the member 70. The length of stroke can be adjusted by the suitable position of the spring 76, the position of which may be changed by loosening the lock nut 82 and sliding the tube 78 to the desired position.

The oscillating motion of the cable system 34 is accomplished by the reversible motor 38. The reversible motor 38 is positioned within the motor housing 61 and hinged so as to permit the motor to rotate around one of its axes. One end of the motor 38 is provided with a stud 84 which projects beyond the end of the motor and is positioned on the central axis thereof. The stud 84 is rotatably secured to a strand 86 which in turn is secured to the floor 88 of the housing 61. The driving pulley 36 is secured to a working shaft 90 which is rotated by the motor through a conventional reduction gear 91 carried by the motor 38. The shaft 90 is rotatably journalled in a stand 92, the stands 92 and 86 cooperating to maintain the motor in a predetermined position with respect to the central axis thereof. Power is supplied to the motor by conventional wiring 94 passing through a suitable opening in the housing 61. It will thus be understood that the motor is secured at its ends, preventing any motion perpendicular to its central axis but leaving it free to rotate around its axis.

Since the motor 38 is reversible, the driving pulley may be caused to rotate either clockwise or counter-clockwise, depending on how the motor is actuated. Direction of rotation is controlled by a pair of switches 96 enclosed in a switch housing 98. The switch housing 98 is secured to a switch stand 100 which is in turn securely fastened to either end of the motor 38. The switch stand 100 is positioned so as to be parallel to the sides of the housing 61. Adjacent the switch housing 98 is a threaded bolt 102 secured to the floor 88 of the housing 61. The bolt 102 carries a pair of switch plates 104 positioned on either side of the switches 96. The switch plates are firmly positioned by a plurality of nuts 106 on either side of the respective plates. The plates are so positioned such that axial rotation of the motor forces one of the switches against a plate thereby throwing the switch and changing the direction of motion of the driving pulley 36.

The amount of torque on the motor 38 necessary to activate the applicable switch 96 is controlled by a spring system indicated generally 108. Welded to the pulley end of the switch stand 100 is a spring arm 110 having a cylindrical opening 112 near the end thereof. An elongated bolt 114 is slidably mounted on the spring arm 110 passing through the opening 112. A pair of springs 116 are carried by the bolt 114 and are positioned on either side of the arm 110. One end of the bolt 114 is secured as by a nut 118 to a brace 120. The brace in turn is secured to the side of the housing 61. By this construction it will be understood that the springs 116 which as loaded are under compression, resist the tendency of the motor to rotate around its major axis.

In the operation of the device thus described, one axle 20 of the baby carriage is secured to the cable system 34 by the clamp 22. The tension on the strand 39 is adjusted by positioning the bolts 42. The length of the oscillating stroke of the device is adjusted by the positioning of the tube 78. The electric motor is then started causing the driving pulley 36 to rotate in one direction. The speed of rotation of the pulley is determined by the reduction gear 91 and by the power applied to the motor which may be controlled by conventional means. Rotation of the pulley moves the cable system 34 thereby pulling the baby carriage along a path controlled by the track 54. Assuming that the driving pulley is rotating in a counterclockwise direction, the sleeve 66 travels toward the spring 74 abutting against the motor housing 61. When the cup 68 engages the spring 74, the motion of the strand is resisted causing a torque force to be applied through the driving pulley to the motor causing the motor to turn on its axis. The turning motion is resisted by the spring system 108. When the torque force exceeds a predetermined amount which may be accurately controlled by the strength of the springs 116 and by the tension put on the cable system 34, the motor turns, forcing one of the switches 96 into a switch plate 104 thereby throwing the switch and reversing the direction of the rotation of the motor and of the driving pulley. The cable system and thus the carriage are then forced in the opposite direction until the cup 68 engages the spring 76 where the reversing process is repeated.

In the event that an obstruction such as, for example, a child's hand or foot, is placed in the path of motion of the carriage, the resistance to motion caused by the obstruction applies a torque force to the motor causing, by the steps described, the direction of motion to be reversed. By suitable adjustment and selection of the springs 116, the sensitivity of the switches 96 and the postion of the switch plates 104, the amount of force necessary to reverse the direction of motion of the motor may be controlled so that the resistance to movement of the carriage caused by a child's finger between the track 54 and the wheel 18 will cause the oscillating system to reverse the direction of motion of the carriage preventing injury to the child.

Having fully described my invention, it is to be understood that I do not wish to be limited to the details set forth, but my invention is of the full scope of the appended claims.

I claim:

1. In a device for oscillating a wheeled carriage, the combination of a reversible motor having a body and a rotatable shaft; means for axially mounting said body to permit motion thereof about one of its principal axes; power transmission means operably connected to said rotatable shaft and to said carriage for moving said carriage; spring means cooperating with said power transmission means for periodically opposing linear motion of said carriage; means operably connected to said body for controlling rotary motion of said body about one of its principal axes; and switch means responsive to rotary motion of said body for reversing the direction of rotation of said shaft.

2. In a carriage oscillating device, including a carriage supported by two pair of wheels mounted on a pair of axles, the improvement comprising, in combination: a pulley system including a driving pulley and a driven pulley; a cable system carried by said pulley system including a strand and means for adjusting tension on said strand, said cable system being responsive to rotation of said driving pulley whereby said strand moves along a linear path; clamp means for connecting one of said axles to said cable system; spring means encircling a portion of said strand for periodically opposing linear motion of said strand and carriage; a reversible motor having a body and a rotatable shaft, said shaft being connected to said driving pulley whereby rotation of said shaft causes rotation of said driving pulley; means for axially mounting said body to permit motion of said body about one of its principal axes; means operably connected to said body and responsive to the action of said spring means for controlling rotary motion of said body about one of its principal axes, and switch means responsive to rotary motion of said body for reversing the direction of rotation of said shaft.

3. In a carriage oscillating device, including a baby carriage supported by two pair of wheels mounted on a pair of axles, the improvement comprising, in combination: a pulley system, including a driving pulley and a driven pulley; a driven pulley casing, a housing, said driving pulley being positioned within said housing; a cable system carried by said pulley system, including a strand connecting said driving pulley and driven pulley, said cable system being responsive to rotation of said driving pulley whereby said strand moves along a linear path; a tubular member connecting said casing to said housing through which said strand passes; clamp means for connecting one of said axles to said cable system; a first spring member housed within said tubular member and abutting against said housing; a second spring member housed within said tubular member and positioned adjacent said casing; means for adjusting the position of said second spring member with respect to said casing, said first and second spring members being positioned to periodically oppose the linear motion of said clamp means; a track positioned parallel to said strand and connected to said casing and said housing upon which at least one of said wheels travels; a reversible motor housed in said housing, said reversible motor having a body and a shaft, said shaft being connected to said driving pulley whereby rotation of said shaft causes rotation of said driving pulley; means carried by said housing for axially mounting said body to permit motion thereof about one of its principal axes; a spring system operably connected to said body damping rotating motion thereof and switch means responsive to the rotating motion of said body for reversing the direction of rotation of said shaft.

References Cited in the file of this patent

UNITED STATES PATENTS

| | | |
|---|---|---|
| 1,662,754 | Millard | Mar. 13, 1928 |
| 2,390,812 | Snyder | Dec. 11, 1945 |
| 2,632,517 | Fraunfelder et al. | Mar. 24, 1953 |
| 2,751,219 | Dodge | June 19, 1956 |